United States Patent
Choi

(10) Patent No.: US 7,522,610 B2
(45) Date of Patent: Apr. 21, 2009

(54) APPARATUS AND METHOD OF TRANSMITTING ATM CELLS IN AN ATM NETWORK BASED MOBILE COMMUNICATION SYSTEM

(75) Inventor: Sang Jun Choi, Anyang-shi (KR)

(73) Assignee: LG Nortel Co., Ltd., Seoul (KR)

( * ) Notice: Subject to any disclaimer, the term of this patent is extended or adjusted under 35 U.S.C. 154(b) by 895 days.

(21) Appl. No.: 10/026,539

(22) Filed: Dec. 27, 2001

(65) Prior Publication Data

US 2002/0085566 A1 Jul. 4, 2002

(30) Foreign Application Priority Data

Dec. 29, 2000 (KR) ............. 10-2000-0085759

(51) Int. Cl.
 H04L 12/28 (2006.01)
 H04B 7/00 (2006.01)
(52) U.S. Cl. .................... 370/395.6; 370/310.1
(58) Field of Classification Search ............. 370/395.6, 370/395.64, 310.1, 473, 474, 471, 395.61
See application file for complete search history.

(56) References Cited

U.S. PATENT DOCUMENTS

| 6,587,465 B1 * | 7/2003 | Dempo ................. 370/395.1 |
| 6,594,266 B1 * | 7/2003 | Kim ..................... 370/395.6 |
| 6,621,821 B1 * | 9/2003 | Song .................... 370/395.6 |
| 6,628,641 B1 * | 9/2003 | Strawczynski et al. ...... 370/349 |
| 6,639,916 B1 * | 10/2003 | Wakizaka ............... 370/397 |
| 6,781,993 B1 * | 8/2004 | Takechi et al. .......... 370/395.1 |
| 6,804,246 B1 * | 10/2004 | Petersen et al. ........ 370/395.64 |
| 6,829,241 B1 * | 12/2004 | Lee ..................... 370/395.64 |
| 6,944,138 B1 * | 9/2005 | Song .................... 370/395.6 |
| 7,054,320 B1 * | 5/2006 | Lee et al. ............... 370/395.6 |
| 2001/0030966 A1 * | 10/2001 | Choi .................... 370/395 |
| 2002/0085564 A1 * | 7/2002 | Lee ..................... 370/395.6 |
| 2003/0156569 A1 * | 8/2003 | Kawakami et al. ......... 370/345 |

* cited by examiner

Primary Examiner—Chi H Pham
Assistant Examiner—Warner Wong
(74) Attorney, Agent, or Firm—KED & Associates, LLP

(57) ABSTRACT

An apparatus and a method of communicating a set of user data in an ATM network-based mobile communication system are disclosed. To transmit the set of user data, N internal AAL packets are generated by adding an internal AAL packet header to each of N data subsets of an original set of user data. The internal AAL packet header includes a sequence number of each data subset. Next, one or more internal AAL cells are generated by multiplexing the internal AAL packets. Then, the original set of user data is restored by demultiplexing the internal AAL packets, included in the internal AAL cells. Thereafter, M AAL2 packets are generated by adding an AAL2 packet header to each of M data subsets of the restored set of user data. And finally, one or more AAL2 cells are generated by multiplexing the AAL2 packets. As a result, the set of user data is transmitted in the system in a much more efficient manner. Therefore, the data traffic rate in each part of the system is greatly enhanced.

9 Claims, 4 Drawing Sheets

APPARATUS AND METHOD OF TRANSMITTING ATM CELLS IN AN ATM NETWORK BASED MOBILE COMMUNICATION SYSTEM

BACKGROUND OF THE INVENTION

This application claims the benefit of Korean Application No. P2000-85759, filed on Dec. 29, 2000, which is hereby incorporated by reference.

1. Field of the Invention

The present invention relates to an advanced mobile communication system and, more particularly, to an apparatus and a method of transmitting and receiving one or more ATM cells in an ATM network-based mobile communication system.

2. Background of the Related Art

In general, a typical mobile communication system includes a mobile station (MS), a base station (BS), a Base Station Controller (BSC), and a Mobile Switching Center (MSC). The system usually handles messages related to three types of call traffic: a voice call, a data call, and a voice/data call. The traffic messages travel between the MS and the BS, the BS and the BSC, and the BSC and the MSC, respectively. The base station is connected to the BSC with an E1 line, and the BSC is connected to the MSC with a Synchronous Transfer Module 1 (STM-1) line.

When the mobile communication system operates in an Asynchronous Transfer Mode (ATM) network system, the traffic messages, mentioned above, are transmitted in the form of ATM cells. In other words, one or more ATM cells travel between the BS and the BSC or between the BSC and the MSC.

In general, the ATM Adaptation Layer (AAL) provides support for higher-layer services such as signaling, circuit emulation, voice, and video. AALs also support packet-based services, such as IP, LANs, and frame relay.

There are four different types of the currently standardized AALs: AAL1, AAL2, AAL3/4, and AAL5. First of all, AAL2 supports ATM transport of connection-oriented Variable Bit Rate (VBR) packetized voice and video. On the other hand, the Common Part (CP) AAL5 supports both connection-oriented and connectionless VBR traffic. Support for connectionless or connection-oriented service is provided at the Service Specific Convergence Sublayer (SSCS) level. However, despite the simplicity of AAL5, AAL5 is now coming under criticism for its relatively inefficient operation, especially for the mix of packet sizes typically used on the Internet.

To use the connection lines of the system more efficiently, the control messages travel in the form of AAL5-type ATM cells (hereinafter, "AAL5 cells"). On the other hand, the traffic messages, including user data, travel in the form of AAL2-type ATM cells (hereinafter, "AAL2 cells") in the ATM network system.

The BS interface, included in the BSC, initially receives AAL2 cells from the BS and subsequently generates AAL5 cells, corresponding to the received AAL2 cells. Then the BS interface sends the AAL5 cells to the main switch element, which is also located inside the BSC. A single AAL5 cell can include only one set of user data. In other words, if a set of user data is too large, so that it needs to be divided into many data subsets, the number of AAL5 cells that need to be generated must be identical to the number of data subsets. Therefore, we may conclude that this is a very inefficient way to transmit user data having a large size.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Accordingly, the present invention is directed to an apparatus and a method of transmitting/receiving a set of user data, in an ATM network-based mobile communication system, that substantially obviates one or more problems due to limitations and disadvantages of the related art.

Another object of the present invention is to provide an apparatus of transmitting a set of user data in a much more efficient way by transmitting one or more internal AAL-type ATM cells that contain the set of user data.

Still another object of the present invention is to provide an apparatus for receiving a set of user data by converting one or more received AAL2-type ATM cells into one or more internal AAL-type ATM cells.

A further object of the present invention is to provide a method of transmitting a set of user data by transmitting one or more internal AAL-type ATM cells that contain the set of user data.

Finally, another object of the present invention is to provide a method of receiving a set of user data by converting one or more received AAL2-type ATM cells into one or more internal AAL-type ATM cells.

To achieve these objects and other advantages and in accordance with the purpose of the invention, as embodied and broadly described herein, an apparatus for transmitting AAL2-type ATM cells (AAL2 cells) in an ATM network system includes an internal AAL transmitter generating one or more internal AAL cells. The internal AAL cells are generated by multiplexing N internal AAL packets, which are themselves generated by adding an internal AAL packet header to an $i^{th}$ data subset of an original user data set, for i=1, 2, 3, ..., N.

The apparatus may further include an internal AAL receiver that restores the original user data set by demultiplexing the N internal AAL packets. An AAL2 transmitter generates one or more AAL2 cells by multiplexing M CPS packets, generated by adding a CPS packet header to a $j^{th}$ data subset of the restored data set, for j=1, 2, 3, ..., M.

In another aspect of the present invention, an apparatus for receiving AAL2-type ATM cells in an ATM network system includes an AAL2 receiver that receives one or more AAL2 cells, containing CPS packets corresponding to an original user data set, and restores the original user data set. The original data set is restored by demultiplexing the CPS packets. An internal AAL transmitter generates one or more internal AAL cells by multiplexing N internal AAL packets, which are themselves generated by adding an internal AAL packet header to an $i^{th}$ data subset of the restored data set, for i=1, 2, 3, ..., N.

The apparatus may further include an internal AAL receiver that restores the original user data set by demultiplexing the N internal AAL packets.

In another aspect of the present invention, a method of transmitting AAL2-type ATM cells in an ATM network system includes generating N internal AAL packets, by adding an internal AAL packet header to an $i^{th}$ data subset of an original user data set, for i=1, 2, 3, ..., N; and generating one or more internal AAL cells by multiplexing the generated N internal AAL packets.

The method may further include restoring the original user data set by demultiplexing the N internal AAL packets included in the internal AAL cells; generating M CPS packets by adding a CPS packet header to a $j^{th}$ data subset of the restored data set, for j=1, 2, 3, ..., M; generating one or more AAL2 cells by multiplexing the M CPS packets; and transmitting the AAL2 cells to a receiving system, through a connection line.

In another aspect of the present invention, a method of receiving AAL2-type ATM cells in an ATM network system includes receiving one or more AAL2 cells containing CPS packets, corresponding to an original user data set, and restoring the original user data set by demultiplexing the CPS packets.

The method may further include generating N internal AAL packets, by adding an internal AAL packet header to an $i^{th}$ data subset of the restored original data set, for i=1, 2, 3, ..., N; and generating one or more internal AAL cells by multiplexing the N internal AAL packets.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
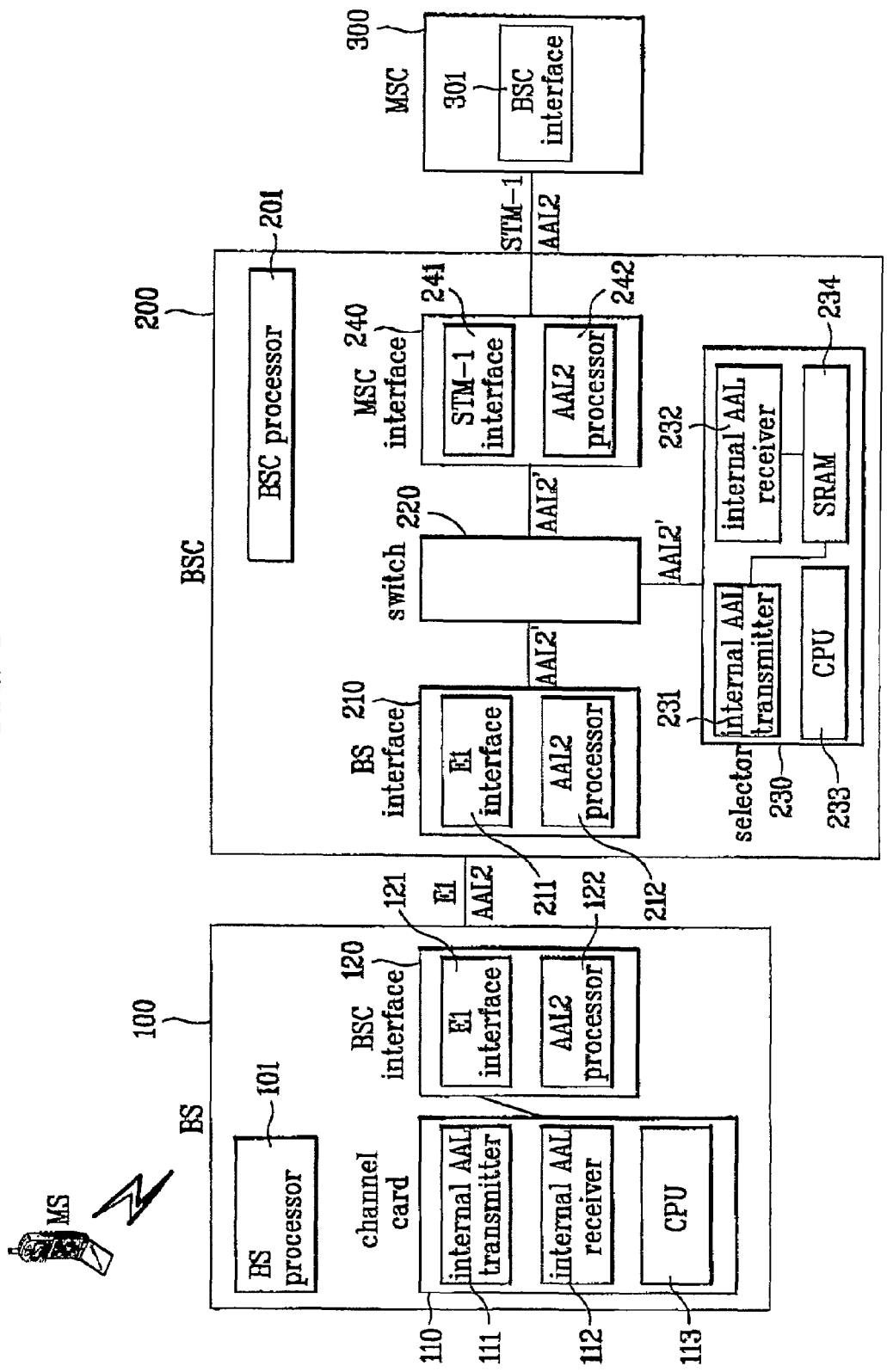
FIG. 1 illustrates an ATM network-based mobile communication system according to the present invention.

FIG. 1 illustrates an ATM network-based mobile communication system of the present invention. The system includes a Base Station (BS) 100, a Base Station Controller (BSC) 200, and a Mobile Switching Center (MSC) 300.

BS 100 includes a BS processor 101, a channel card 110, and a BSC interface 120. The channel card 110 includes an internal AAL transmitter 111, an internal AAL receiver 112, and a CPU 113. The BSC interface 120 includes an E1 interface 121 and an AAL2 processor 122.

BSC 200 includes a BSC processor 201, a BS interface 210, a switch 220, a selector 230, and an MSC interface 240. The BS interface 210 includes an E1 interface 211 and an AAL2 processor 212. The selector 230 includes an internal AAL transmitter 231, an AAL2 receiver 232, a CPU 233, and an SRAM 234. The MSC interface 240 includes an STM-1 interface 241 and an AAL2 processor 242.

Lastly, the MSC 300 includes a BSC interface 301.

In addition, the AAL2 processor 242 included in the MSC interface 240 is preferably identical to that of AAL2 processor 212, included in the BS interface 210. Similarly, the structure of AAL2 processor 212, of the BS interface 210, is preferably identical to the AAL2 processor 122, of the BSC interface 120. However the function of the AAL2 processor 212 is opposite to that of the AAL2 processor 122. This is explained in detail later in this section.

Figure 2:
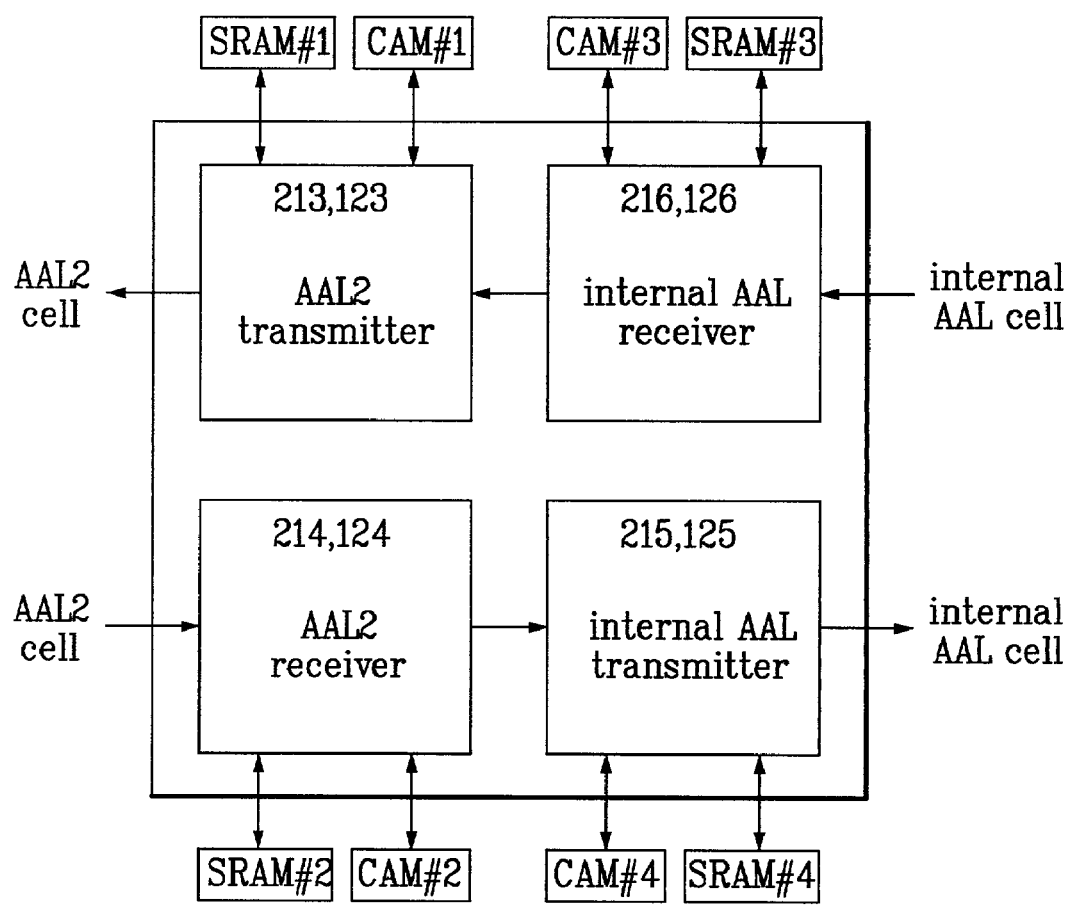
FIG. 2 illustrates the structure of each AAL processor used in the system, shown in FIG. 1.

FIG. 2 illustrates the structure of each AAL2 processor (122, 212, and 242) included in the mobile communication system, shown in FIG. 1. Each AAL processor includes an AAL2 transmitter (123 or 213), an AAL2 receiver (124 or 214), an internal AAL transmitter (125 or 215), and an internal AAL receiver (126 or 216).

Figure 5A:
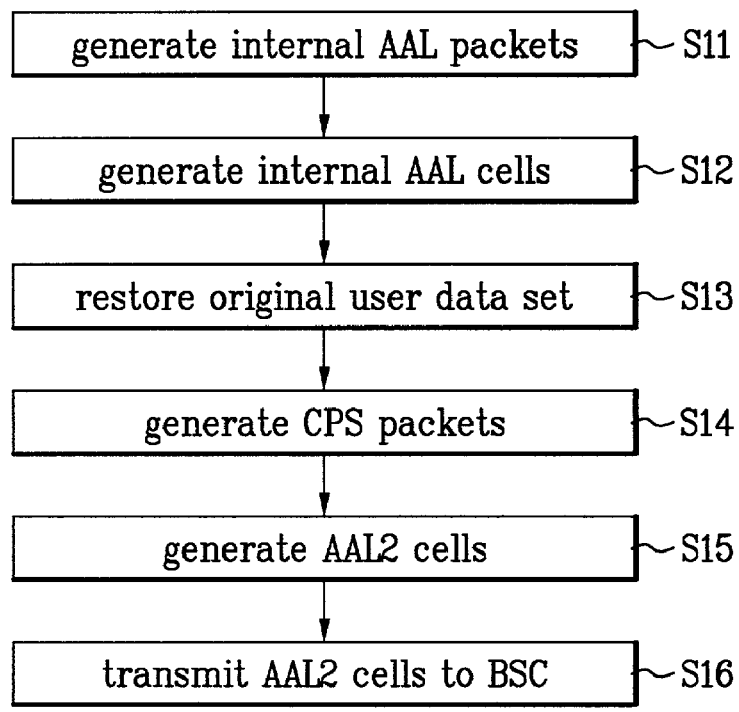
FIG. 5A is a flow chart illustrating a method of transmitting one or more AAL2 cells in an ATM network system, in accordance with the present invention.
Figure 5B:
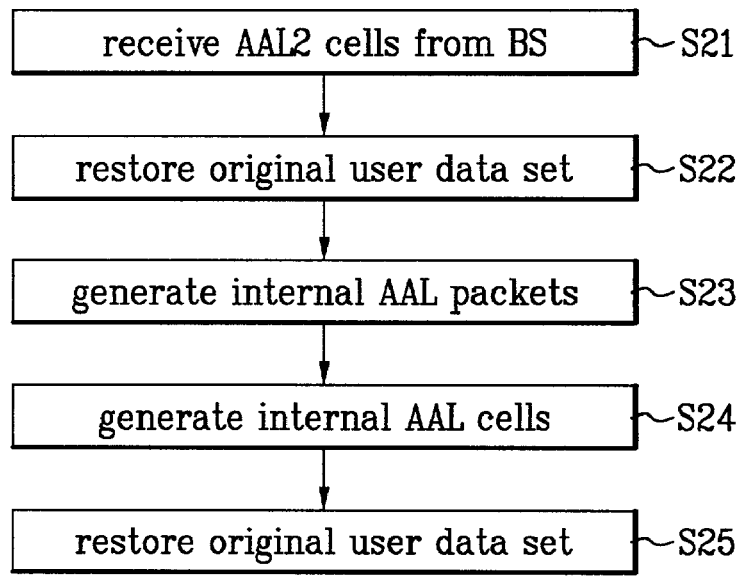
FIG. 5B is a flow chart illustrating a method of receiving one or more AAL2 cells in an ATM network system, in accordance with the present invention.

Reference will now be made to the methods of transmitting and receiving ATM cells in the ATM network-based mobile communication system, according to the present invention, examples of which are illustrated in FIG. 5A and FIG. 5B, respectively.

The internal AAL transmitter 111, included in the channel card 110, initially generates N internal AAL-type ATM packets (hereinafter, "internal AAL packets") by adding an internal AAL packet header to an $i^{th}$ data subset of an original user data set, for i=1, 2, 3, ..., N (S11). Subsequently, the internal AAL transmitter 111 generates one or more internal AAL-type ATM cells (hereinafter, "internal AAL cells") by multiplexing the generated N internal AAL packets (S12).

Figure 3:
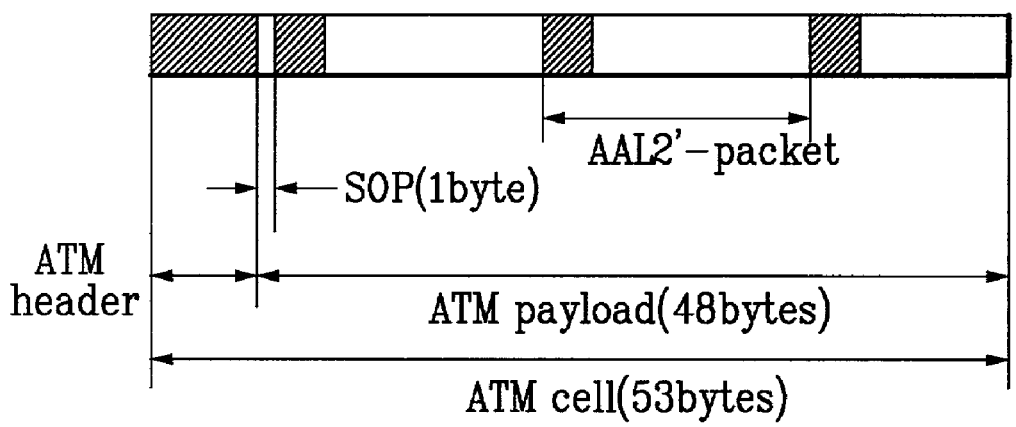
FIG. 3 illustrates the structure of an internal AAL cell generated in the system, shown in FIG. 1.

FIG. 3 illustrates the structure of an internal AAL cell, generated by the internal AAL transmitter 111 of the ATM network system, according to the present invention. The 53-byte internal AAL cell includes an ATM header (5 bytes) and an ATM payload (48 bytes). Furthermore, the 48-byte ATM payload includes a Start of Packet (SOP) field (1 byte), which indicates the starting location of each internal AAL packet within the ATM payload.

The ATM payload (48 bytes), of an internal AAL cell, may include one or more internal AAL packets, representing one or more user data sets, as shown in FIG. 3. On the other hand, if an internal AAL packet has a size of N bytes, N being greater than 47 bytes, then the first 47 bytes of the packet will be included in an internal AAL cell and all other N-47 bytes of the packet will be included in one or more subsequent internal AAL cells. Therefore, multiple internal AAL cells may contain the information of a single internal AAL packet, which represents a single user data set.

Figure 4:
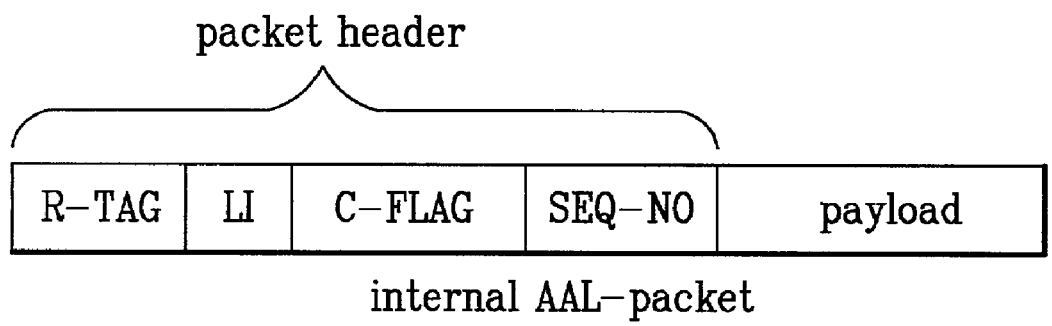
FIG. 4 illustrates the structure of each internal AAL packet included in the internal AAL cell, shown in FIG. 3.

FIG. 4 illustrates the structure of each internal AAL packet. Each packet includes a packet header (3 bytes) and a payload (1-64 bytes). The 3-byte packet header includes R-TAG (1 byte), LI (7 bits), C-FLAG (1 bit), and SEQ-NO (1 byte). R-TAG represents a routing tag field, which is an identifier identifying each user data set, and LI represents a Length Indicator indicating the length of the data included in the payload.

Additionally, C-Flag (1 bit) and SEQ-NO (1 byte) may be used in a case where the size of a set of user data is greater than 48 bytes. If a set of user data is greater than 48 bytes, the original set of user data may be divided into two or more user data subsets. Then, each data subset can be included in an internal AAL packet. C-FLAG is used to indicate whether the data subset, included in an internal AAL packet, is the last subset of the original data. If the subset of data corresponds to the beginning or an intermediate subset of the original data, C-FLAG is set to one. On the other hand, C-FLAG is set to zero if the subset corresponds to the last data subset of the original set of user data.

SEQ-NO represents the sequence number of each data subset of the original user data set. Therefore, the SEQ-NO of each of the $1^{st}, 2^{nd}, 3^{rd}, \ldots, N^{th}$ subsets will be 1, 2, 3, ..., N, respectively. If the user data subject to be transmitted is less than 48 bytes, C-FLAG and SEQ-NO are set to zero. The number of data subsets, of an original user data set, will be determined by consent of the BS processor 101 and the BSC processor 201 shown in FIG. 1.

When the internal AAL receiver 126 of AAL2 processor 122, receives one or more internal AAL cells, generated by the internal AAL transmitter 111, the internal AAL receiver 126 restores the original user data set by demultiplexing the N internal AAL packets included in the internal AAL cells (S13). Thereafter, the internal AAL receiver 126 sends the restored original user data set to the AAL2 transmitter 123 which is also included in the AAL2 processor 122. Then the AAL2 transmitter initially generates M Common Part Sublayer (CPS) packets (hereinafter, "CPS packets"), by adding a CPS packet header to a $j^{th}$ data subset of the restored data set, for j=1, 2, 3, ..., M (S14). Subsequently, the AAL2 transmitter 123 generates one or more AAL2-type ATM cells (hereinafter, "AAL2 cells") by multiplexing the M CPS packets (S15). Finally, it sends the AAL2 cells to the BSC 200 through the E1 line (S16).

Thereafter, when the AAL2 receiver 214, included in AAL2 processor 212, receives the AAL2 cells containing the M CPS packets, corresponding to the original user data set (S21), it restores the original user data set by demultiplexing the CPS packets (S22). Subsequently, the internal AAL transmitter 215, of AAL2 processor 212, generates P internal AAL packets by adding an internal AAL packet header to a $k^{th}$ data subset of the restored original data set, for k=1, 2, 3, ..., P (S23). Next, the AAL transmitter 215 generates one or more internal AAL cells by multiplexing the P internal AAL packets (S24). Thereafter, the switch 220 receives the internal AAL cells and sends them to the internal AAL receiver 232, of the selector 230. Similarly, when the internal AAL receiver 232 of the selector 230 receives one or more internal AAL cells from the switch 220 it restores the original user data set by demultiplexing the internal AAL packets, included in the internal AAL cells (S25), and sends the restored user data to the CPU 233.

If the original user data set sent by the channel card 110 is less than 48 bytes, then the internal AAL receiver 232 receives only one internal AAL cell and directly sends the user data, included in the AAL cell, to CPU 233. On the other hand, if the original user data set is greater than or equal to 48 bytes, it means that there are at least two internal AAL cells generated by the internal AAL transmitter 111, of channel card 110. Therefore, the internal AAL receiver receives at least two internal AAL cells from the switch 220, and it stores each data subset of the original user data set in SRAM 234. When all of the data subsets of the user data set are stored in the SRAM 234, the internal AAL receiver 232 restores the original user data set using the C-FLAG and SEQ-NO fields of each internal AAL packet, included in the internal AAL cells received from the switch 220.

As a result, the original user data set is transmitted within the mobile communication system in a much more efficient manner using the internal AAL2-type ATM cells, which include the original user data set. Since the number of cells being transmitted in the whole system is reduced, the data traffic rate of the system is also greatly reduced.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. An apparatus for transmitting asynchronous transfer mode (ATM) adaptation layer-2 (AAL2) type ATM cells (AAL2 cells), comprising:
    an AAL transmitter to generate one or more AAL cells by multiplexing N AAL packets, generated by adding an AAL packet header to an $i^{th}$ data subset of an original single user data set, wherein each of the one or more AAL cells includes an ATM header and a Start of Packet field to indicate a starting location of an $i^{th}$ one of the N AAL packets within the corresponding AAL cell, the AAL transmitter residing in a channel card, the channel card further including an AAL receiver and a CPU;
    an AAL receiver to receive the one or more AAL cells generated by the AAL transmitter and to restore the original single user data set by demultiplexing the N AAL packets included in the one or more AAL cells, the AAL receiver residing in an AAL2 processor; and
    an AAL2 transmitter to receive the restored original single user data set from the AAL receiver and to generate one or more of the AAL2 cells by multiplexing M common part sublayer (CPS) packets, generated by adding a CPS packet header to a $j^{th}$ data subset of the restored original single user data set, the AAL2 transmitter residing in the AAL2 processor,
    wherein i, j, N, and M are positive integers, $1 \leq i \leq N$, and $1 \leq j \leq M$.

2. The apparatus of claim 1, wherein the AAL packet header includes a sequence number of the $i^{th}$ data subset.

3. The apparatus of claim 2, wherein the AAL packet header further includes a routing tag field to identify the original single user data set and a length indicator field to indicate the length of the $i^{th}$ data subset.

4. The apparatus of claim 3, wherein the AAL packet header further includes a C-FLAG field to indicate whether the $i^{th}$ data subset represents the $N^{th}$ data subset of the original single user data set.

5. An apparatus for receiving asynchronous transfer mode (ATM) adaptation layer-2 (AAL2) type ATM cells (AAL2 cells), comprising:
    an AAL2 receiver to receive one or more of the AAL2 cells, containing common part sublayer (CPS) packets corresponding to a single original user data set, and to restore the single original user data set by demultiplexing the CPS packets, the AAL2 receiver residing in an AAL2 processor;
    an AAL transmitter to receive the restored single original user data set from the AAL2 receiver and to generate one or more AAL cells by multiplexing N AAL packets, generated by adding an AAL packet header to an $i^{th}$ data subset of the restored single original user data set, wherein each of the one or more AAL cells includes an ATM header and a Start of Packet field to indicate a starting location of an $i^{th}$ one of the N AAL packets within the corresponding AAL cell, the AAL transmitter residing in the AAL2 processor; and
    an AAL receiver to receive the one or more AAL cells from the AAL transmitter and to restore the single original user data set by demultiplexing the N AAL packets, the AAL receiver residing in a selector, the selector further including a second AAL transmitter and a CPU,
wherein
i and N are positive integers and $1 \leq i \leq N$.

6. The apparatus of claim 5, wherein the AAL packet header includes a sequence number of the $i^{th}$ data subset, a routing tag field identifying the single original user data set, and a length indicator field indicating the length of the $i^{th}$ data subset.

7. The apparatus of claim 6, wherein the AAL packet header further includes a C-FLAG field to indicate whether the $i^{th}$ data subset represents the $N^{th}$ data subset of the single restored original user data set.

8. A method for transmitting asynchronous transfer mode (ATM) adaptation layer-2 (AAL2) type ATM cells (AAL2 cells), comprising:
   generating N AAL packets by adding an AAL packet header to an $i^{th}$ data subset of an original single user data set, the AAL packet header including a sequence number of the $i^{th}$ data subset, a routing tag field identifying the original user data set, a length indicator field indicating a length of the $i^{th}$ data subset, and a C-FLAG field indicating whether the $i^{th}$ data subset represents an $N^{th}$ data subset of the original single user data set, the generating being performed in an AAL transmitter residing in a channel card, the channel card further including an AAL receiver and a CPU;
   generating one or more AAL cells by multiplexing the generated N AAL packets in the AAL transmitter of the channel card, wherein each of the one or more AAL cells includes an ATM header and a Start of Packet field that indicates a starting location of an $i^{th}$ one of the N AAL packets within the corresponding AAL cell;
   receiving the original single user data set at an AAL receiver;
   restoring the received original single user data set by demultiplexing the N AAL packets included in the AAL cells, the restoring being performed by the AAL receiver residing in an AAL2 processor;
   receiving the restored original single user data set at an AAL2 transmitter;
   generating M common part sublayer (CPS) packets by adding a CPS packet header to a $j^{th}$ data subset of the restored original single user data set by the AAL2 transmitter residing in the AAL2 processor;
   generating one or more of the AAL2 cells by multiplexing the M CPS packets by the AAL2 transmitter residing in the AAL2 processor; and
   transmitting the AAL2 cells to a receiving system through a connection line, wherein
   i, j, N, and M are positive integers, $1 \leq i \leq N$, and $1 \leq j \leq M$.

9. A method of receiving asynchronous transfer mode (ATM) adaptation layer 2 (AAL2) type ATM cells (AAL2 cells), comprising:
   receiving a plurality of AAL2 cells containing common part sublayer (CPS) packets corresponding to an original single user data set, the receiving being performed in an AAL2 receiver residing in an AAL2 processor;
   restoring the original single user data set by demultiplexing the CPS packets by the receiver in the AAL2 processor;
   receiving the restored original single user data set at an AAL transmitter;
   generating N AAL packets by adding an AAL packet header to an $i^{th}$ data subset of the restored original single user data set, the AAL packet header including a sequence number of the $i^{th}$ data subset, a routing tag field identifying the original single user data set, a length indicator field indicating a length of the $i^{th}$ data subset, and a C-FLAG field indicating whether the $i^{th}$ data subset represents the $N^{th}$ data subset of the restored original single user data set, the generating being performed by the AAL transmitter residing in the AAL2 processor;
   generating one or more AAL cells by multiplexing the N AAL packets by the AAL transmitter residing in the AAL2 processor, wherein each of the one or more AAL cells includes an ATM header and a Start of Packet field to indicate a starting location of an $i^{th}$ one of the N AAL packets within the corresponding AAL cell;
   receiving the one or more AAL cells at an AAL receiver; and
   restoring the original single user data set by demultiplexing the N AAL packets included in the one or more AAL cells, the restoring being performed by the AAL receiver residing in a selector, the selector further including a second AAL transmitter and a CPU,
   wherein
   i and N are positive integers and $1 \leq i \leq N$.

* * * * *